United States Patent [19]
Onodera et al.

[11] 3,876,306
[45] Apr. 8, 1975

[54] METHOD OF STATE-DIFFERENTIATING ANALYSIS OF SPECIFIED ELEMENTS IN METALS AND COMPOSITION ADJUSTMENT THEREOF

[75] Inventors: Masaaki Onodera; Masao Saeki; Tadayosi Sakata, all of Himeji, Japan

[73] Assignee: Nippon Steel Corporation, Tokyo, Japan

[22] Filed: May 6, 1974

[21] Appl. No.: 467,457

Related U.S. Application Data
[63] Continuation of Ser. No. 275,877, July 27, 1972, abandoned.

[30] Foreign Application Priority Data
July 30, 1971 Japan.............................. 46-57279

[52] U.S. Cl. ..................... 356/85; 356/77; 356/82
[51] Int. Cl. ............................. G01j 3/30; G01j 3/40
[58] Field of Search ................... 356/77, 82, 85, 86

[56] References Cited
UNITED STATES PATENTS
3,600,091  8/1971  Goleb et al. .................... 356/85
3,669,546  6/1972  Virloget ............................. 356/86

OTHER PUBLICATIONS
"A Method of Background Correction . . .;" Leys; Anal. Chemistry; Vol. 41; No. 2; Feb. 69; pp. 396–398.

*Primary Examiner*—Vincent P. McGraw
*Attorney, Agent, or Firm*—Toren, McGeady and Stanger

[57] ABSTRACT

A spectroscopic method for analyzing specific elements in metals by analyzing the homogenous and heterogeneous states in which the elements are found to exist and separating the homogeneous from the heterogeneous states to determine the amounts of the elements contained in the analyzed metal. Spectral lines obtained from the spectroscopic sample are converted into photocurrent in which the average intensity thereof is determined to determine the elements in the homogeneous state, with the remainder of the sample indicating those elements not in the homogeneous state, i.e., in the heterogeneous state.

13 Claims, 3 Drawing Figures

METHOD OF STATE-DIFFERENTIATING ANALYSIS OF SPECIFIED ELEMENTS IN METALS AND COMPOSITION ADJUSTMENT THEREOF

This is a continuation of Application Ser. No. 275,877 filed July 27, 1972, and now abandoned.

BACKGROUND OF THE INVENTION

The present invention relates to a method for rapidly determining specified elements in metals existing in different states by dividing photoelectric current, and is very useful for quick analysis of molten metals during processing.

Certain specified elements are added to a metal as is well known to improve some properties and to achieve degassing, cleaning and adjusting the particle size of crystals of the metal.

For example, aluminum is added to steel to make non-aging steel by removing oxygen or stabilizing nitrogen in steel.

Although the contents of $Al_2O_3$, $AlN$ and metallic Al in molten steel when aluminum is added could be determined by analyzing the steel sample after treatment, the contents may be determined by the time when further addition of aluminum to the steel is possible to permit improvement of the steel and of the process.

Conventionally, state-differentiated aluminum contents of aluminum in steel are determined by chemical analytical methods which take half an hour to several hours after sampling, so that correction treatment on the basis of analytical result is difficult as to limit the use of analytical data.

The present invention intends to solve the problems occurring in the conventional methods of analysis by using the state-differentiating spectroscopic determination of specified elements in metals involving the photoelectric differential method.

SUMMARY OF THE INVENTION:

The present invention states, 1. a method of state-differentiating analysis of specified elements in metals by the spectroscopic method comprising converting into photocurrent the intensities of spectral lines of the specified elements emitted by discharging with the metal specimen serving as the electrode in which the elements exist in homogeneous and heterogeneous states, integrating the whole photocurrent of the specified elements, at the same time differentially eliminating the photocurrent which corresponds to the quantity of the elements existing in the state other than the homogeneous state by comparing said current with the average intensity of the photocurrent of the specified elements existing in the homogeneous state to obtain the integrated photocurrent of the elements in the homogeneous state, and determining from the difference between the two integration values the state-differentiated contents of the specified elements in metals, and 2. a method of state-differenetiating analysis of specified elements in metals by the spectroscopic method comprising converting into photocurrent the intensities of spectral lines of the specified elements emitted by discharging with the metal specimen serving as the electrode in which the elements exist in homogenous and heterogeneous states, differentially eliminating the photocurrent which corresponds to the quantity of the elements existing in the state other than homogeneous state by comparing the current with the average intensity of the photocurrent of the specified elements existing in the homogeneous state to obtain the integrated photocurrent of the elements in the homogeneous state, and thereby determining the content of the components in the homogeneous state.

The specified elements in metals referred to in the present invention mean the metallic elements added to the metal which exist in the form of a solid solution with the host metal or compounds with impurity elements in the metal forming different chemical species that exist respectively in different states. As an illustration thereof, chemical behavior of aluminum added to steel will be mentioned. When a certain amount of aluminum is added to steel, a fraction of the aluminum combines with oxygen in the steel to form $Al_2O_3$ of which a portion floats up to the surface and the remainder is uniformly dispersed in the steel in relatively large particles. Another portion of the aluminum combines with nitrogen in the steel to form $AlN$ which exists dispersed in relative uniformity in and around crystal particles. The particle size of $AlN$ is much smaller than that of $Al_2O_3$. Further the remainder of aluminum added forms a solid solution with the steel within the limit of solubility.

Among the states of aluminum $Al_2O_3$, $AlN$ and $Al$, the form of oxide, $Al_2O_3$, which exists in a heterogeneously dispersed state is usually unfavored and large particles or a colony of particles of this species might particularly deteriorate mechanical properties of the steel.

On noticing this problem, the present inventors comparatively investigated the difference between the components of the specified elements in the homogeneous and heterogeneous states by converting the respective light intensities into photocurrents, and found a remarkable difference in the photocurrent.

The present invention will be described in detail referring to the attached drawings.

DETAILED DESCRIPTION

The following list of elements designated by the corresponding numerals are used to illustrate this invention:

1,2 Photocurrent; 3 Emission apparatus; 4 Emission stand; 5 Spectrometer; 6, 6' Photoelectric tube; 7 photocurrent separator; 8, 8' Integrator; 9 Indicator for calculated value; 1a, 1b Photocurrent for the homogeneous state; 2a, 2b Photocurrent for the heterogeneous state.

Figure 1:
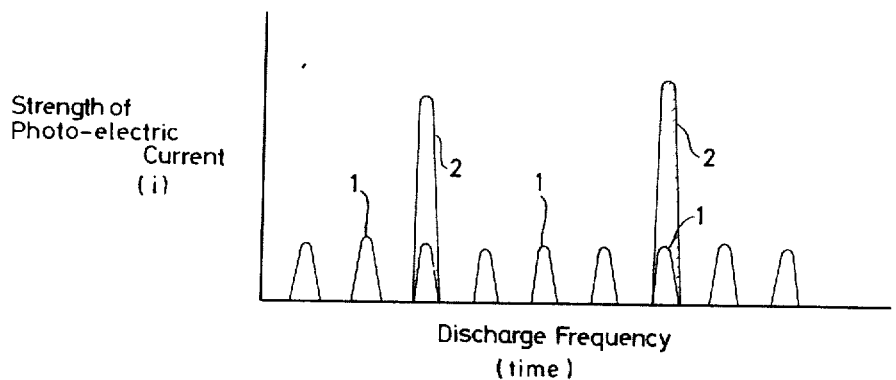
FIG. 1 is an explanatory figure showing the intensities of the specified element added to the metal existing as components in the homogeneous and heterogeneous states.
Figure 2:
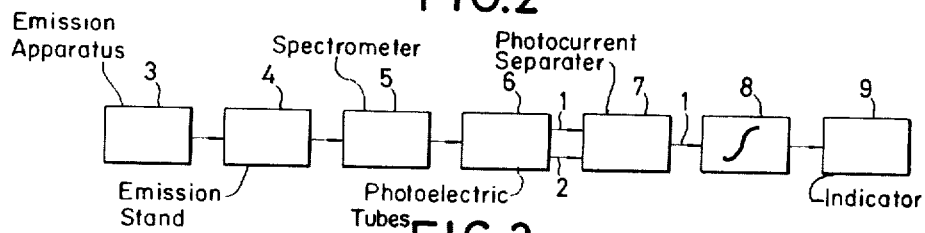
FIG. 2 shows an example of application of the method of this invention.

As shown in FIG. 2, a specimen of steel to which aluminum is added as a specified element is placed on an emission stand 4 equipped with the emission apparatus 3. A voltage high enough to discharge is applied between the specimen and a counter-electrode which produces an arc column with the element excited by the electrical energy. A spectrum of the arc column is obtained with the spectrometer 5 and the intensity thereof is converted into a photocurrent with the photoelectric tube 6. Photocurrent produced from the homogeneous components such as Al and AlN is stable as shown by the current 1 in FIG. 1, while the current from the heterogeneous component such as $Al_2O_3$ is abnormally large, due to the abnormally strong intensity of light produced by the discharge, and is of large variance as shown by the current 2.

The photocurrent 2 larger than the mean of the photocurrent 1 produced by the homogeneous components is differentially eliminated by means of a photocurrent separater 7 which is composed of gating devices such as a diode and transistor, and that part of the photocurrent 1 which is below the mean value produced by the homogeneous components is integrated with an integrator 8 having a condenser to form the mean value of the photocurrent 1, which is then shown on the indicator 9 as the combined Al and AlN content.

Figure 3:
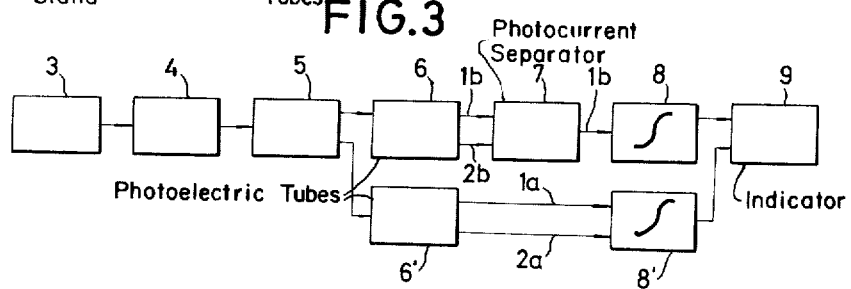
FIG. 3 shows a different example of the application of this invention.

As can be seen in FIG. 3, the spectral intensity of the specified element produced by the discharge is converted by means of two photoelectric tubes 6 and 6' into the photocurrents 1$a$ and 1$b$ for the homogeneous components and the photocurrents 2$a$ and 2$b$ for the heterogeneous component, respectively, where the photocurrents 1$a$ and 1$b$ are of the equal value and 2$a$ and 2$b$ are also equal.

Among the above photocurrents, 1$a$ and 2$a$ are integrated with the integrator 8'. On the other hand, the photocurrent 2$b$ that is stronger than the mean value of the photocurrent 1$b$ produced by the homogeneous components is eliminated with the photocurrent separater 7, and the photocurrent 1$b$ from the homogeneous components that remains as being below the mean value is integrated with the integrater 8. The mean value and the mean difference values of the two integrated values are calculated and shown on the indicator 9. The mean of the integrated values of the photocurrents 1$a$ and 2$a$ shows the total amount of aluminum, while the mean integrated value of the photocurrent 1$b$ shows the homogeneous components, Al and AlN and the mean difference shows the heterogeneous component $Al_2O_3$.

In practising the process of this invention, the mean value of the photocurrent corresponding to the particular state of occurrence of the specified element should be known prior to application. The mean value of photocurrent should be precise, since the precision thereof decides the precision of analysis for each component in different states of occurrence as a result of differentially eliminating the photocurrent of the latter components with the mean photocurrent value of the former component as basis.

The particular state of occurrence that appears in the above expression means the homogeneous state.

The mean value of the photocurrent corresponding to the component in the homogeneous state may be determined as follows: in the first preliminary treatment, photocurrents which are produced at repeated discharges of a required number, for example 100 – 200, are integrated. The integrated photocurrent including those by the homogeneous and heterogeneous states gives the mean value of photocurrent, which is at a higher level than that of the component in the particular state of occurrence. Subsequently, the second preliminary treatment is carried out where the same number of discharges are applied as in the first treatment. From the total photocurrent obtained, the photocurrent corresponding to the components other than the components in the particular state of occurrence is differentially eliminated with the mean value calculated in the first treatment as bases. The remaining photocurrent, that is the photocurrent corresponding to the components in the particular state and a part of the photocurrent corresponding to the components in the state other than the particular state, is integrated, and the mean value thereof is obtained. Thus, in the repeated preliminary treatment of discharge, the photocurrent corresponding to the components other than those in the particular state is differentially eliminated repeatedly from the integrated photocurrent obtained with the mean value of the photocurrent as a basis, to permit the mean value of the components in the particular state to be calculated.

The precision of the mean value of the above photocurrent apparently depends on both the intensity of photocurrent at each discharge and the frequency of the preliminary discharges, and therefore conditions of preliminary discharges are decided according to the precision required.

The mean value of photocurrent decided as above is preset in the photocurrent separater 7 in practising the process of the present invention.

The above mean value of photocurrent should be estimated for each different metal sample.

The following is comparative data of state-differentiating analysis of specified elements added to steel performed by conventional chemical analytical method and by the process of the present invention.

| Specified element added | Method | Component in homogeneous state (%) | Component in heterogeneous state(%) | Time required for analysis (sec.) |
|---|---|---|---|---|
| Al | Conventional | 0.050 | 0.004 | 1800 |
|  | Present | 0.051 | 0.003 | 30 |
| Ti | Conventional | 0.020 | 0.004 | 1800 |
|  | Present | 0.019 | 0.003 | 30 |
| B | Conventional | 0.025 | 0.0010 | 7200 |
|  | Present | 0.027 | 0.0007 | 30 |

Time required for analysis for the conventional method implies the analysis time only for the component in homogeneous state, and the components in heterogeneous state were determined as difference from the total obtained with a quantometer.

As can be seen from the above table, the method of the present invention requires less than 1/60 time for analysis in comparison with conventional chemical analytical method with comparative precision of the results.

Further, since the process of this invention requires little time, any desired treatment in accordance with the obtained result such as, for example, a further addition of the specified element may be possible.

Next, descriptions shall be made on one example in which the method of the present invention is applied to the case where aluminum is added to molten steel to obtain non-ageing steel having good workability.

100 tons of molten steel of C : 0.05%, Si : 0.01%, Mn : 0.5%, P : 0.01% and S : 0.02% was received in a ladle, and 1.0 kg of aluminum per one ton of molten steel was added to make the steel non-ageing. Then the aluminum was analyzed by its forms according to the present inventive method and the results showed 0.020% of heterogeneous aluminum and 0.015% of homogeneous aluminum. As it was clear from this analysis that good workability was not obtained, 0.2 kg/t of aluminum was further added to the molten steel in the ladle to adjust the composition, and the result of aluminum analysis by its states showed 0.035% of homogeneous aluminum and 0.002% of heterogeneous aluminum.

Thus, it was possible to know quickly and accurately the analysis of the molten steel by using the method of the present invention, and the composition adjustment based on the analysis assured more than 95of of appropriateness within the aimed range (0.03% – 0.07% of homogeneous aluminum).

Meanwhile, in the case of convention method where it is impossible to conduct timely the composition analysis, the appropriateness is 80 – 90% due to the requirement of much experience and constant operation conditions, and the operation conditions must be controlled very closely.

As above mentioned, as it is possible to analyze the sepecific elements in metals very quickly, any desired treatments such as re-addition of specific elements can be conducted based on the obtained analysis without restricting the operating conditions.

What is claimed is:

1. A spectroscopic method for state-differentiation analysis of amounts of elements contained in a metal in the homogeneous and heterogeneous states, comprising intermittently discharging said metal serving as an electrode when the elements exist in said homogeneous and heterogeneous states, forming an arc column during each intermittent discharge, producing spectral lines of each arc column, converting the intensities of said sepctral lines into photocurrent pulses and applying the pulses to a separator, forming a separation level at which the photocurrent pulses representing each state are respectively above and below the level passing the photocurrent pulse through said separator to pass only the photocurrent pulse representing one of said states.

2. A spectroscopic method as set forth in claim 1, wherein the current representing the homogeneous state is below the separation level and the separator passes only the photocurrent pulses representing the homogeneous state and further comprising the step of integrating the photocurrent pulses passed by said separator to form the mean value of the homogeneous photocurrent pulses representing the amount of elements in the homogeneous state in the analyzed metal.

3. A spectroscopic method as set forth in claim 2, further comprising the step of pre-setting said separation level to be approximately equal to the mean value of the photocurrent pulses representative of the amount of elements contained in the metal being in the homogeneous state.

4. A spectroscopic method as set forth in claim 2, further comprising forming a second set of photocurrent pulses representing the homogeneous and heterogeneous states, integrating the combined photocurrent pulses representing the homogeneous and heterogeneous states, forming the mean difference value between the combined entire photocurrent pulses and the integrated photocurrent pulses, representing the amount of elements in the homogeneous state to form a value representative of the amount of material in the heterogeneous state, and forming the mean value of the combined photocurrent pulse which is representative of the entire amounts of elements contained in the analyzed metal.

5. The spectroscopic method as set forth in claim 4, further comprising the step of adjusting the amounts of said elements after said state differentiation analysis is completed so as to provide a desired amount of element in the heterogeneous and homogeneous states.

6. Apparatus for state differentiation analysis of elements contained in a metal, comprising discharge means using said metal as an electrode for intermittently discharging said metal to form intermittent arcs, means for spectroscopically analyzing each arc to form spectral lines related to the homogeneous and heterogeneous states in which the elements are found in the metal, a converter for converting said spectral lines into photocurrent pulses, a separator coupled to said converter and having a preset value at which the photocurrent pulses representing each state are respectively above and below the level for passing photocurrent pulses representing one of the states, and integrator means connected to said separator for forming the means value of the passed photocurrent pulses for representing the amount of the elements in one of the states in the metal analyzed.

7. Apparatus for state differentiation as set forth in claim 6, comprising a second integrator for forming the mean value of the entire photocurrent representing both the heterogeneous and homogeneous states, and means for forming the difference between the outputs of said integrator and said second integrator for providing the amount of elements in the heterogeneous state.

8. Apparatus for state differentiation as set forth in claim 6, wherein said metals repeatedly discharge a predetermined number of times.

9. Apparatus for state differentiation as set forth in claim 6, wherein said separator comprises a photocurrent separator.

10. Apparatus for state differentiation as set forth in claim 8, further comprising means for adding additional amounts of said elements existing in the homogeneous and heterogeneous states to cause said metal to contain a predetermined amount of said elements in said states.

11. The method as in claim 1, wherein the step of discharging said metal serving as an electrode occurs at plural micro-size portions thereof.

12. An apparatus as in claim 6, wherein said spectroscopic device includes means for discharging the metal at plural micro-size portions thereof.

13. A spectroscopic method for state-differentiation analysis of amounts of elements contained in a metal in the homogeneous and heterogeneous states, comprising discharging said metal to form light, converting amounts of said light of said elements in the homogeneous and heterogeneous states into photocurrent pulses, and distinguishing the heterogeneous state from the homogeneous state by discriminating between the individual intensities of the photocurrent pulses.

* * * * *